No. 845,001. PATENTED FEB. 19, 1907.
A. S. HENRY.
RAILWAY WHEEL.
APPLICATION FILED SEPT. 14, 1906.
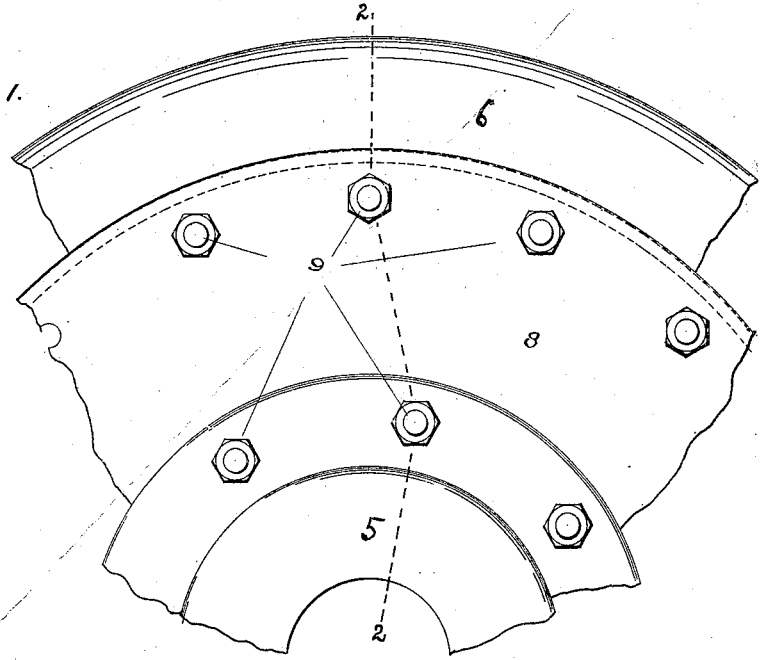
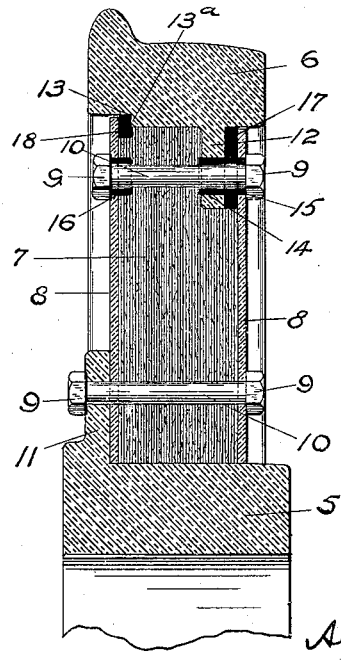
WITNESSES
M. E. Keir
M. Schmidt
INVENTOR
Alexander S. Henry
by
Howson and Howson
ATTORNEYS

UNITED STATES PATENT OFFICE.

ALEXANDER S. HENRY, OF NEW YORK, N. Y.

RAILWAY-WHEEL.

No. 845,001.　　　Specification of Letters Patent.　　　Patented Feb. 19, 1907.

Application filed September 14, 1906. Serial No. 334,685.

*To all whom it may concern:*

Be it known that I, ALEXANDER S. HENRY, a citizen of the United States of America, and residing in the borough of Manhattan, city of New York, county of New York, in the State of New York, have invented certain new and useful Improvements in Railway-Wheels, of which the following is a specification.

This invention relates to wheels, and particularly to railway-wheels, the object of my invention being to provide a steady and durable wheel the tire of which is electrically insulated from the hub thereof.

In the accompanying drawings, Figure 1 is a side view of portion of a wheel in which my invention is incorporated. Fig. 2 is a cross-section on the line 2 2, Fig. 1.

In carrying out my invention I construct the wheel in three principal portions—a metal hub 5, a metal rim 6, and an intervening body portion of insulating material 7. This body portion may be made of any suitable insulating material. I prefer, however, to construct it of compressed paper fiber, which is of great strength and durability when properly prepared and compressed, as well as being light and a perfect non-conductor. Metal ring-plates are added one on each side of the insulating-body of the wheel to give an additional firmness thereto and to afford a suitable weather-face to the compressed fiber and also a suitable surface against which the nuts 9, which fasten the securing-bolts, may be secured.

I provide the hub with an annular flange 11 of sufficient strength and secure the body portion of the wheel thereto by any suitable means, as by bolts 10, which pass through registering holes in the two ring-plates 8, the body 7 and the hub-flange 11 being secured by means of nuts 9. The rim is also provided with an annular flange 12; but as a means of uniting the body and rim I further "step" the latter at 13 and project the insulating-body portion at this point, so that it presses against the face 13ª. Thus on securing the parts together by means of bolts which pass through holes registering through the two plates 8, the flange 12, and the body 7, the projecting flange of the latter is clamped against the face 13ª of the step 13, thus giving additional firmness to the united parts.

In constructing the ring-plates 8 they are made of such width only that while they may come in contact with the hub they do not make contact with the rim at their outer edge. Consequently the only way by which an electric current could pass between the rim of the wheel and the hub must be through the annular flange 12 on the rim, the bolts 10, which come in contact therewith, and the side plates 8, through which the bolt passes. To prevent this, I enlarge the holes in the flange 12 sufficiently to permit the insertion of an insulating-bushing 14, through which the bolt passes. While the tire is thereby insulated from the hub of the wheel, other bushings may be inserted for additional safety between the bolts 10 and the plates 8 at 15 and 16 and insulating-rings placed between the plates 8 and the rim and its flange at 17 and 18.

I claim as my invention—

A wheel having independent hub and rim portions and an intervening non-conducting body portion in combination with an inwardly-projecting annular flange on the rim portion provided with holes, insulating-bushings to line said holes, said plates facing the body portion of the wheel provided with holes registering with the holes in the flange on the rim and securing-bolts passing through said registering holes, substantially as described.

In testimony whereof I have signed my name to this specification in the presence of two subscribing witnesses.

ALEXANDER S. HENRY.

Witnesses:
　LOUIS J. DOLFINI,
　PERCY HARPER.